United States Patent
Hong et al.

(10) Patent No.: US 9,467,380 B2
(45) Date of Patent: Oct. 11, 2016

(54) DATA CENTER NETWORK FLOW MIGRATION METHOD AND SYSTEM THEREOF

(71) Applicants: Inventec (Pudong) Technology Corp., Shanghai (CN); Inventec Corporation, Taipei (TW)

(72) Inventors: Wei-Fan Hong, Taipei (TW); Kuo-Chen Wang, Taipei (TW); Yu-Chun Yeh, Taipei (TW); Dean-Chung Wang, Taipei (TW); Ping-Liang Lin, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 67 days.

(21) Appl. No.: 14/672,240

(22) Filed: Mar. 30, 2015

(65) Prior Publication Data

US 2016/0156558 A1    Jun. 2, 2016

(30) Foreign Application Priority Data

Nov. 27, 2014  (CN) .......................... 2014 1 0709872

(51) Int. Cl.
| | | |
|---|---|---|
| *H04L 12/803* | (2013.01) | |
| *H04L 12/721* | (2013.01) | |
| *H04L 12/44* | (2006.01) | |
| *H04L 12/707* | (2013.01) | |
| *H04L 12/26* | (2006.01) | |
| *H04L 12/24* | (2006.01) | |

(52) U.S. Cl.
CPC ............. *H04L 47/122* (2013.01); *H04L 12/44* (2013.01); *H04L 41/12* (2013.01); *H04L 43/0817* (2013.01); *H04L 45/22* (2013.01); *H04L 45/44* (2013.01); *H04L 2012/445* (2013.01)

(58) Field of Classification Search
CPC ....... H04L 45/44; H04L 45/22; H04L 12/44; H04L 43/0876; H04L 47/122
See application file for complete search history.

(56) References Cited

U.S. PATENT DOCUMENTS

| | | | | |
|---|---|---|---|---|
| 9,007,958 B2* | 4/2015 | Gupta | ................... | H04L 12/462 370/254 |
| 2003/0091165 A1* | 5/2003 | Bearden | .............. | H04L 12/2697 379/88.08 |
| 2003/0097438 A1* | 5/2003 | Bearden | .............. | H04L 12/2697 709/224 |
| 2012/0124167 A1* | 5/2012 | Schlansker | ............. | H04L 45/48 709/217 |
| 2014/0046882 A1* | 2/2014 | Wood | ....................... | G06N 3/02 706/16 |

* cited by examiner

*Primary Examiner* — Khaled Kassim
*Assistant Examiner* — Syed S Ali
(74) *Attorney, Agent, or Firm* — Winston Hsu; Scott Margo

(57) ABSTRACT

A data center network flow migration method includes detecting a utilized loading value in each switch of a plurality of switches in the data center network by a controller according to topology information of the data center network. The controller re-establishes a plurality of link paths corresponding to the plurality of switches in the data center network according to the utilized loading value in each switch and a disjoint edge node divided spanning tree algorithm. In these re-established link paths corresponding to the plurality of switches in the data center network, if the utilized loading value of at least one link path is greater than a threshold value, the at least one link paths with the utilized loading value greater than the threshold value is rerouted by a controller according to a flow migration algorithm.

9 Claims, 4 Drawing Sheets

DATA CENTER NETWORK FLOW MIGRATION METHOD AND SYSTEM THEREOF

BACKGROUND OF THE INVENTION

1. Field of the Invention

The present invention illustrates a data center network flow migration method and system, and more particularly, a data center network flow migration method and system with low computational complexity.

2. Description of the Prior Art

With the advancement of cloud computing system, virtualization technique becomes an important issue in our daily life. The idea of virtualization technique is to use several virtual machines instead of a physical host server. These virtual machines are operated in parallel and can provide reliable service quality. However, when the virtualization technique is applied to cloud computing system, the data center network requires massive computational complexity, computational capability, and data storage capacity. Thus, a soft defined network (SDN) system in conjunction with Openflow structure is developed by Stanford University. The original propose is to extend the programmable capability for campus network and provide the corresponding virtualization client interface. Generally, the soft defined network includes a centralized controller and thousands of switches. These switches are interconnected and coupled to all physical host servers through complex link paths. Specifically, these interconnected switches are assigned according to a topology structure. In other words, the data center network under soft defined network is established according to the topology structure.

However, data center network includes massive number of switches. A pair of physical servers can communicate through a link path located on several switches. When data center network suffers heavy traffic load that at least one link path is over-utilized, traffic congestion may be occurred in high probability. To avoid traffic congestion, all switches and link paths in data center network have to be dynamically allocated at any moment. By doing so, the utilized load of link path can be reduced. Thus, the traffic congestion in data center network can be mitigated. To achieve dynamic allocation, dynamic and disjoint edge node divided spanning tree ($D^2$ENDIST) algorithm can be applied in data center network. The $D^2$ENDIST algorithm performs dynamic allocation by calculating the number of nodes, the combinations of traffic load in each node, and all possible rerouted link paths. Thus, when $D^2$ENDIST algorithm is applied to data center network for optimizing the allocation of all switches and link paths, the computational complexity is extremely high (i.e., $5^{th}$ powers increasing rate) so that the hardware for $D^2$ENDIST algorithm is difficult to realize.

Thus, it is important to develop a flow migration method for optimizing the allocation of all switches and link paths with low computational complexity in data center network.

SUMMARY OF THE INVENTION

In an embodiment of the present invention, a flow migration method for a data center network is disclosed. The method includes detecting a utilized loading value in each switch of a plurality of switches in the data center network by a controller according to topology information of the data center network, re-establishing a plurality of link paths corresponding to the plurality of switches in the data center network by the controller according to the utilized loading value in each switch and a disjoint edge node divided spanning tree algorithm, and when the utilized loading value of at least one link path is greater than a threshold value in the re-established link paths corresponding to the plurality of switches in the data center network, rerouting the at least one link path with the utilized loading value greater than the threshold value by a controller according to a flow migration algorithm.

In another embodiment of the present invention, a flow migration system for a data center network is disclosed. The system includes a plurality of switches being interconnected according to topology information, and a controller connected to the plurality of switches wherein the controller detects a utilized loading value in each switch of the plurality of switches in the data center network according to the topology information of the data center network, the controller is configured to re-establish a plurality of link paths corresponding to the plurality of switches in the data center network according to the utilized loading value in each switch and a disjoint edge node divided spanning tree algorithm, and when the utilized loading value of at least one link path is greater than a threshold value in the re-established link paths corresponding to the plurality of switches in the data center network, the at least one link path with the utilized loading value greater than the threshold value is rerouted by the controller according to a flow migration algorithm.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
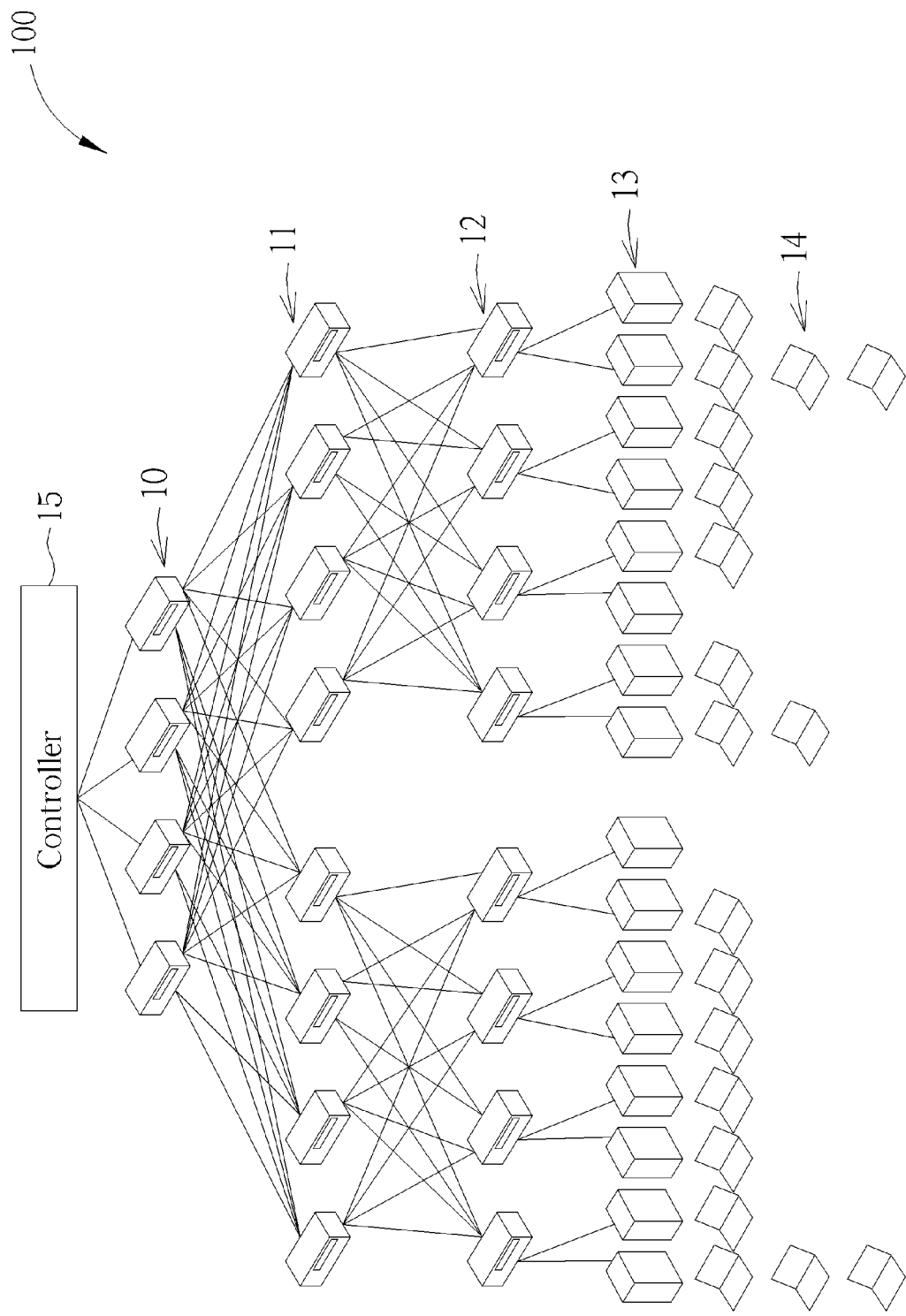
FIG. 1 is a schematic structure illustration of a data center network according to the embodiment of the present invention.

FIG. 1 is a schematic structure illustration of a data center network 100 according to an embodiment of the present invention. As shown in FIG. 1, the data center network 100 includes a plurality of core level switches 10, a plurality of aggregate level switches 11, a plurality of edge level switches 12, a plurality of servers 13, a plurality of virtual machines 14, and a controller 15. In the embodiment, the data center network 100 is established according to Fat-Tree topology information and has three levels switches. The plurality of core level switches 10 are topmost switches in the topology structure. The plurality of aggregate level switches 11 are medium level in the topology structure. The plurality of edge level switches 12 are lowermost switches in the topology structure. All switches in three-leveled structure are interconnected according to topology information in FIG. 1. The plurality of servers 13 in the embodiment are regarded as physical machines. A pair of servers 13 can transmit data through the switches. A plurality of virtual machines 14 are regarded as non-physical machines activating by the users. These virtual machines 14 are connected to the corresponding servers 13 for utilizing hardware resources and bandwidth of each server 13. For example, in FIG. 1, a leftmost server 13 is connected to 3 virtual machines 14. These 3 virtual machines 14 can transmit data to other virtual machines through the leftmost server 13. The controller 15 is connected to all switches 10 to 12, all servers 13, and all virtual machines 14, for managing and provisioning the traffic load. However, when massive servers 13 transmit data through switches 10 to 12, at least one of link path may be over utilized and results in traffic congestion. The existence of traffic congestion of specific link path leads traffic congestion propagation associating with several subtrees of topology structure. To avoid traffic congestion propagation, a method for reallocating all traffic nodes (i.e., switches, servers, and virtual machines) by using dynamic and disjoint edge node divided spanning tree ($D^2$ENDIST) algorithm. The idea is to reroute all link paths with over utilization by dynamically calculating the number of nodes, the combinations of traffic load in each node, and all possible rerouted link paths. By using $D^2$ENDIST algorithm, the computational complexity for rerouting all link paths with over utilization is extremely high, which approaches $O(N_S^5)$, $N_S$ being the number of the switches in the data center network 100, and $O(\cdot)$ being the function of computational complexity (big O). To reduce the computational complexity of $D^2$ENDIST algorithm, the present invention introduces a two-stages reroute algorithm instead of using $D^2$ENDIST algorithm. Specifically, the two-stage reroute algorithm has a tolerant computational complexity for hardware realization in conjunction with high transmission efficiency after rerouting several link paths with over utilization. The method of two-stages reroute algorithm is illustrated below.

Figure 2:
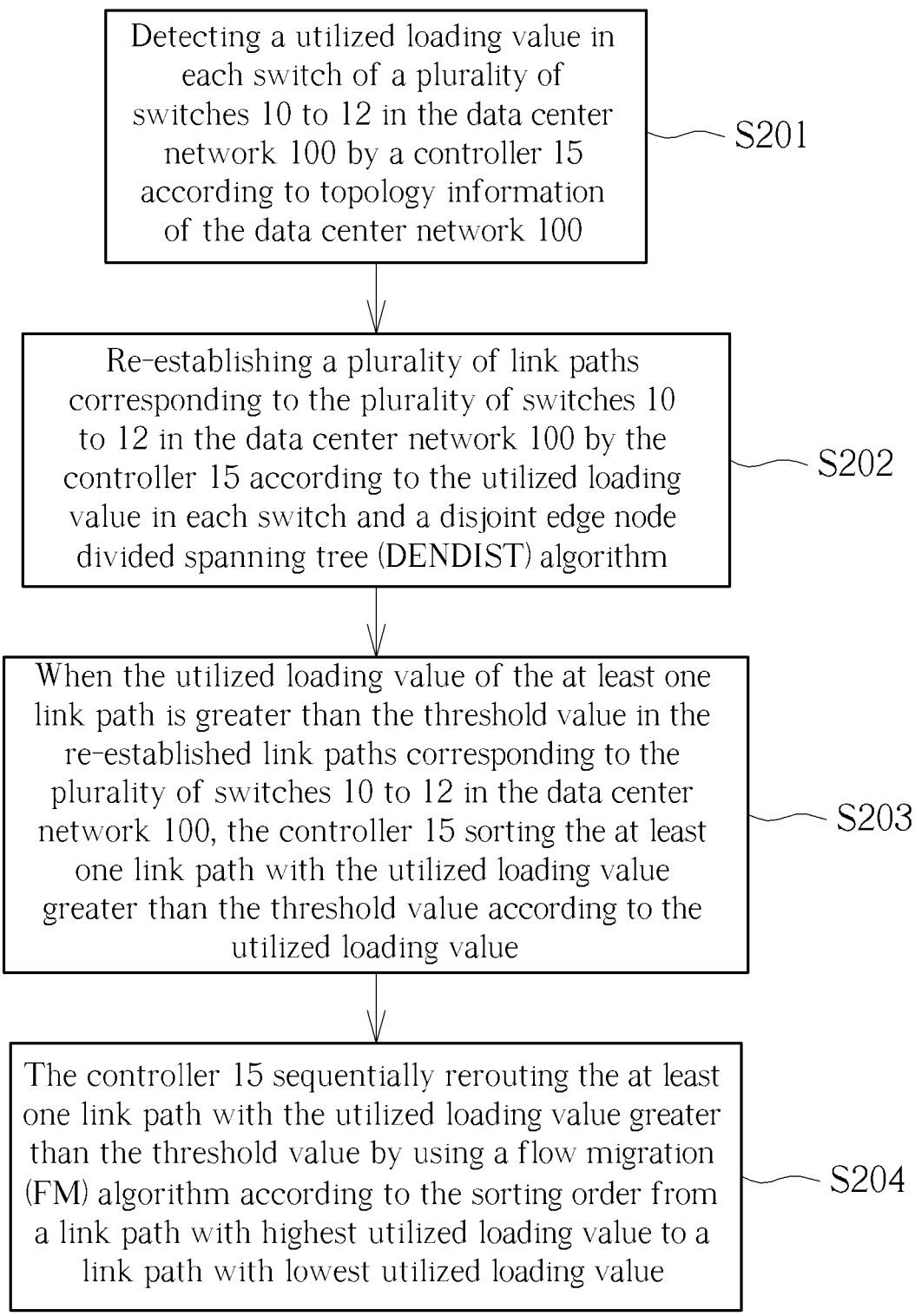
FIG. 2 illustrates the flow chart of flow migration method of the data center network in FIG. 1 according to the present invention.

FIG. 2 illustrates the flow chart of flow migration method of the data center network 100 in FIG. 1 according to the present invention. As shown in FIG. 2, step S201 to step S204 are introduced to achieve the flow migration method of the data center network 100, as S201: detecting a utilized loading value in each switch of a plurality of switches 10 to 12 in the data center network 100 by a controller 15 according to topology information of the data center network 100;

S202: re-establishing a plurality of link paths corresponding to the plurality of switches 10 to 12 in the data center network 100 by the controller 15 according to the utilized loading value in each switch and a disjoint edge node divided spanning tree (DENDIST) algorithm;

S203: when the utilized loading value of the at least one link path is greater than the threshold value in the re-established link paths corresponding to the plurality of switches 10 to 12 in the data center network 100, the controller 15 sorting the at least one link path with the utilized loading value greater than the threshold value according to the utilized loading value; and S204: the controller 15 sequentially rerouting the at least one link path with the utilized loading value greater than the threshold value by using a flow migration (FM) algorithm according to the sorting order from a link path with highest utilized loading value to a link path with lowest utilized loading value.

In step S201, the data center network 100 establishes initial topology structure according to link layer discovery protocol (LLDP). When the topology structure is established, the traffic load of each initial link path (node) of the corresponding switch can be acquired. However, if the link path and the corresponding utilized loading value (i.e., say, the utilized number) are not appropriately allocated, some link paths will be over utilized and cause traffic congestion. To avoid traffic congestion, in step S202, the controller 15 re-establishes a plurality of link paths corresponding to the plurality of switches 10○12 in the data center network 100 according to utilized loading value in each switch and a DENDIST algorithm. Specifically, DENDIST algorithm is a static link path allocation algorithm. Comparing from $D^2$ENDIST and DENDIST algorithm, DENDIST algorithm is regarded as a causal system since it only considers the current utilized loading value of switches (nodes). As a result, the DENDIST algorithm has low computational complexity approaching $O(N_S^3)$, $N_S$ being the number of the switches in the data center network 100, and $O(\cdot)$ being the function of computational complexity (big O). After rerouting the majority of link paths with over utilization by using the DENDIST algorithm, a few link paths with over utilization still exist and may cause traffic congestion. In the following step S203, the controller 15 detects the utilized loading value of all link paths processed in step S202 and then compares the utilized loading value of each link path with a threshold value. When the utilized loading value is greater than the threshold value, the controller 15 sorts all link paths with the utilized loading values greater than the threshold value according to the utilized loading values. In step S204, the controller 15 sequentially reroutes the link paths with the utilized loading values greater than the threshold value by using a flow migration (FM) algorithm according to the sorting order from a link path with highest utilized loading value to a link path with lowest utilized loading value. Specifically, the FM algorithm has low computational complexity approaching $O(N_S^2)$. After processing by step S201 to step S204, if data center network 100 has tolerant system utilized loading (i.e., at least one candidate link path can be detected for rerouting the path with over utilization), all link paths with over utilization can be rerouted by using DENDIST algorithm in conjunction with FM algorithm. Since both DENDIST and FM algorithms have low computational complexity, the hardware for preventing traffic congestion of all link paths in data center 100 is realizable. The examples of applying DENDIST and FM algorithms are illustrated below.

Figure 3:
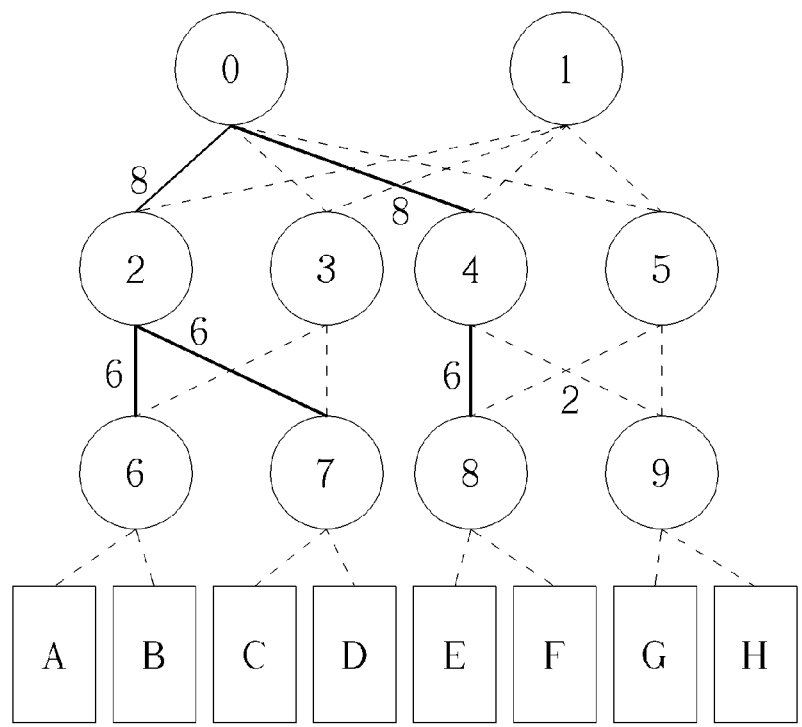
FIG. 3 illustrates the link path initialization of the data center network in FIG. 1 according to the present invention.

FIG. 3 illustrates the link path initialization of the data center network 100 in FIG. 1 according to the present invention. As shown in FIG. 3, ten switches are considered in data center network 100, as switch 0 to switch 9. Eight servers are considered in data center network 100, as server A to server H. To presentation simplicity, only 10 link paths among server A to server H are considered in this example, as link path P1 to link path P10, expressed by:

P1: server A→switch 6→switch 2→switch 0→switch 4→switch 8→server E;

P2: server B→switch 6→switch 2→switch 0→switch 4→switch 8→server E;

P3: server A→switch 6→switch 2→switch 0→switch 4→switch 8→server F;

P4: server B→switch 6→switch 2→switch 0→switch 4→switch 8→server F;

P5: server C→switch 7→switch 2→switch 0→switch 4→switch 8→server E;

P6: server C→switch 7→switch 2→switch 0→switch 4→switch 8→server F;

P7: server C→switch 7→switch 2→switch 0→switch 4→switch 9→server G;

P8: server C→switch 7→switch 2→switch 0→switch 4→switch 9→server H;

P9: server A→switch 6→switch 2→switch 7→server C; and

P10: server A→switch 6→switch 2→switch 7→server D.

In FIG. 3, several duplicated switches are located on the link path P1 to link path P10. It implies that several path intervals of link path P1 to link path P10 are reused. The following table lists the utilized loading values in each path interval between a pair of switches located on the link path P1 to link path P10, as

| Path Interval | The number of reused (Utilized Loading Values) |
| --- | --- |
| switch 6 → switch 2 | 6 |
| switch 2 → switch 0 | 8 |
| switch 0 → switch 4 | 8 |
| switch 4 → switch 8 | 6 |
| switch 7 → switch 2 | 6 |
| switch 4 → switch 9 | 2 |

In the embodiment, when the utilized loading values of the core level switches (switches 0 and switch 1) for linking out other switches are greater than 6, these path intervals are regarded as over utilization. When the utilized loading values of the aggregate level switches (switch 2 to switch 5) for linking out other switches are greater than 3, these path intervals are regarded as over utilization. According to the utilized loading values of table, 5 path intervals are over utilized, as path interval of switch 6→switch 2 (6 times), path interval of switch 7→switch 2 (6 times), path interval of switch 2→switch 0 (8 times), path interval of switch 0→switch 4 (8 times), and path interval of switch 4→switch 8 (6 times). These 5 over utilized path intervals are presented as solid lines in FIG. 3. Specifically, these 5 over utilized path intervals may suffer traffic congestion in high probability. Thus, data center network 100 applies DENDIST algorithms for optimizing the allocation of all the initial link paths and path intervals, as illustrated below.

Figure 4:
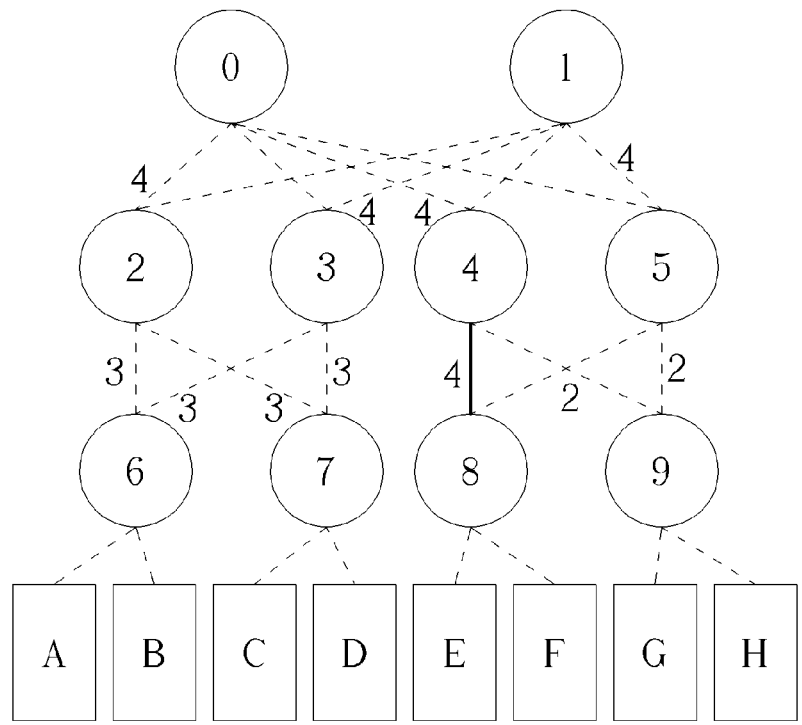
FIG. 4 illustrates the method of applying disjoint edge node divided spanning tree algorithm of the data center network in FIG. 1 according to the present invention.

FIG. 4 illustrates the method of applying DENDIST algorithm of the data center network 100 in FIG. 1 according to the present invention. As the same definition in FIG. 3, ten switches are considered in data center network 100, as switch 0 to switch 9. Eight servers are considered in data center network 100, as server A to server H. The source server and the destination server of link path P1 to link path P10 are equal to the link paths in FIG. 3. As shown in FIG. 4, when the DENDIST algorithm is applied to data center network 100, the majority of over utilized link paths are rerouted by the controller 15. After rerouting by using the DENDIST algorithm, new link path P1 to link path P10 can be expressed by P1: server A→switch 6→switch 2→switch 0→switch 4→switch 8→server E;

P2: server B→switch 6→switch 3→switch 1→switch 5→switch 8→server E;

P3: server A→switch 6→switch 2→switch 0→switch 4→switch 8→server F;

P4: server B→switch 6→switch 3→switch 1→switch 5→switch 8→server F;

P5: server C→switch 7→switch 2→switch 0→switch 4→switch 8→server E;

P6: server C→switch 7→switch 2→switch 0→switch 4→switch 8→server F;

P7: server C→switch 7→switch 3→switch 1→switch 5→switch 9→server G;

P8: server C→switch 7→switch 3→switch 1→switch 5→switch 9→server H;

P9: server A→switch 6→switch 2→switch 7→server C; and

P10: server A→switch 6→switch 3→switch 7→server D.

In FIG. 4, several duplicated switches are located on the link path P1 to link path P10. It implies that several path intervals of link path P1 to link path P10 are reused. The following table lists the utilized loading values in each path interval between a pair of switches located on the link path P1 to link path P10, as

| Path Interval | The number of reused (Utilized Loading Values) |
| --- | --- |
| switch 6 → switch 2 | 3 |
| switch 2 → switch 0 | 4 |
| switch 0 → switch 4 | 4 |
| switch 4 → switch 8 | 4 |
| switch 7 → switch 2 | 3 |
| switch 4 → switch 9 | 2 |
| switch 7 → switch 3 | 3 |
| switch 6 → switch 3 | 3 |
| switch 3 → switch 1 | 4 |
| switch 1 → switch 5 | 4 |
| switch 5 → switch 9 | 2 |

In the embodiment, when the utilized loading values of the core level switches (switches 0 and switch 1) for linking out other switches are greater than 6, these path intervals are regarded as over utilization. When the utilized loading values of the aggregate level switches (switch 2 to switch 5) for linking out other switches are greater than 3, these path intervals are regarded as over utilization. According to the utilized loading values of table, one path interval is over utilized, as path interval of switch 4→switch 8 (4 times). The over utilized path interval is presented as solid lines in FIG. 4. After rerouting by using the DENDIST algorithm, at least one over utilized link path (or path interval located on the link path) still exists, as path interval of switch 4→switch 8. Specifically, the over utilized path interval may suffer traffic congestion in high probability. Thus, the data center network 100 further applies flow migration algorithm for optimizing the allocation of all the initial link paths and path intervals, as illustrated below.

Figure 5:
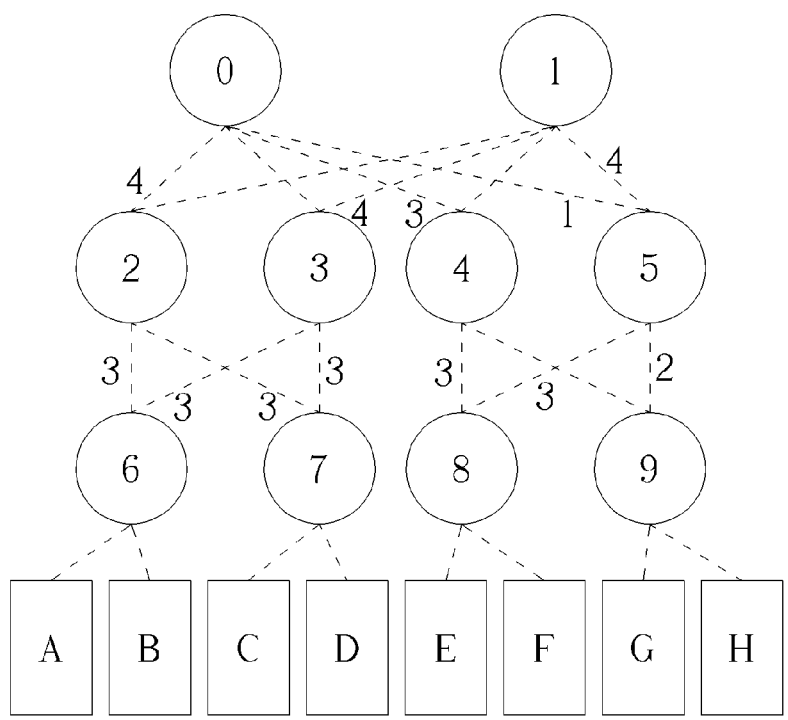
FIG. 5 illustrates the method of using a flow migration algorithm of the data center network in FIG. 4 according to the present invention.

FIG. 5 illustrates the method of using a flow migration algorithm (FM) of the data center network in FIG. 4 according to the present invention. As the same definition in FIG. 4, ten switches are considered in data center network 100, as switch 0 to switch 9. Eight servers are considered in data center network 100, as server A to server H. The source and destination of link path P1 to link path P10 are similar in FIG. 4. As shown in FIG. 5, when the FM algorithm is applied to data center network 100, all of over utilized link paths rerouted after using DENDIST algorithms are rerouted by the controller 15. As a result, all link paths and path intervals become non-over utilization after using FM algorithm. In FIG. 4, after rerouting by using the DENDIST algorithm, one over utilized path interval still exists, as path interval of switch 4→switch 8. In FIG. 5, the path interval of switch 4→switch 8 is routed by using FM algorithm. Specifically, the invention is not limited by using FM algorithm to reroute one path interval. In other embodiments, when at least one path intervals with over utilization still exists after using the DENDIST algorithm, the controller 15 sorts the at least one link path (path interval) with over utilization according to the utilized loading value. Then, the controller 15 sequentially reroutes the at least one link path (path interval) with over utilization by using FM algorithm according to the sorting order from a link path (path interval) with highest utilized loading value to a link path (path interval) with lowest utilized loading value. In the embodiment, after rerouting the path interval of switch 4→switch 8 by using FM algorithm, new link path P1 to link path P10 can be expressed by P1: server A→switch 6→switch 2→switch 0→switch 4→switch 8→server E;
P2: server B→switch 6→switch 3→switch 1→switch 5→switch 8→server E;
P3: server A→switch 6→switch 2→switch 0→switch 4→switch 8→server F;
P4: server B→switch 6→switch 3→switch 1→switch 5→switch 8→server F;
P5: server C→switch 7→switch 2→switch 0→switch 5→switch 8→server E;
P6: server C→switch 7→switch 2→switch 0→switch 4→switch 8→server F;
P7: server C→switch 7→switch 3→switch 1→switch 5→switch 9→server G;
P8: server C→switch 7→switch 3→switch 1→switch 5→switch 9→server H;
P9: server A→switch 6→switch 2→switch 7→server C; and
P10: server A→switch 6→switch 3→switch 7→server D.

In FIG. 5, several duplicated switches are located on the link path P1 to link path P10. It implies that several path intervals of link path P1 to link path P10 are reused. The following table lists the utilized loading values in each path interval between a pair of switches located on the link path P1 to link path P10, as

| Path Interval | The number of reused (Utilized Loading Values) |
|---|---|
| switch 6 → switch 2 | 3 |
| switch 2 → switch 0 | 4 |
| switch 0 → switch 4 | 3 |
| switch 4 → switch 8 | 3 |
| switch 7 → switch 2 | 3 |
| switch 4 → switch 9 | 3 |
| switch 7 → switch 3 | 3 |
| switch 6 → switch 3 | 3 |
| switch 3 → switch 1 | 4 |
| switch 1 → switch 5 | 4 |
| switch 5 → switch 9 | 2 |
| switch 0 → switch 5 | 1 |

In the embodiment, when the utilized loading values of the core level switches (switches 0 and switch 1) for linking out other switches are greater than 6, these path intervals are regarded as over utilization. When the utilized loading values of the aggregate level switches (switch 2 to switch 5) for linking out other switches are greater than 3, these path intervals are regarded as over utilization. According to the utilized loading values of table, no path interval is over utilized. Thus, after rerouting the initial 5 path intervals with over utilization (i.e., path interval of switch 6→switch 2 (6 times), path interval of switch 7→switch 2 (6 times), path interval of switch 2→switch 0 (8 times), path interval of switch 0→switch 4 (8 times), and path interval of switch 4→switch 8 (6 times)) by using DENDIST and FM algorithm, the utilized loading values of all link path P1 to link path P10 and their path intervals are reduced. As a result, since all path intervals in data center network 100 are non-over utilized after using DENDIST and FM algorithm, the traffic congestion occurs in very low probability. The transmission efficiency can be greatly improved.

Figure 6:
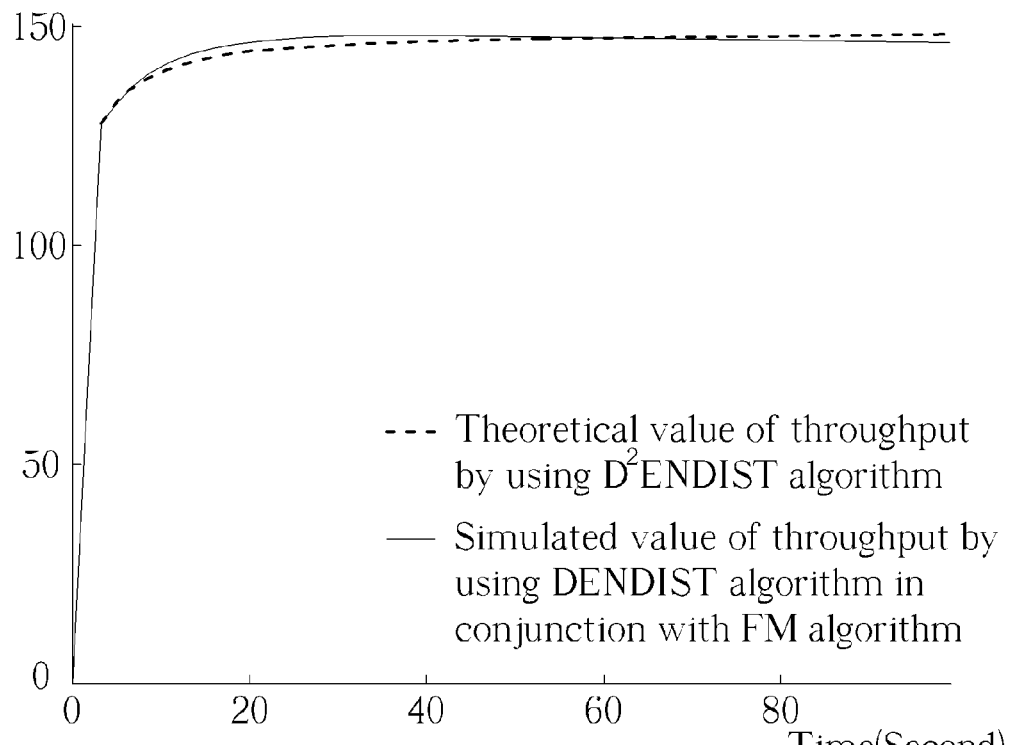
FIG. 6 illustrates the simulated performance results of applying a dynamic and disjoint edge node divided spanning tree algorithm, and disjoint edge node divided spanning tree in conjunction with flow migration algorithm of the data center network in FIG. 1 according to the present invention.

FIG. 6 illustrates the simulated performance results of applying a $D^2$ENDIST algorithm, and DENDIST algorithm in conjunction with FM algorithm of data center network 100 in FIG. 1 according to the present invention. As shown in FIG. 6, X-axis denotes the processing time. Y-axis denotes the throughput performance. In FIG. 6, the theoretical value of throughput by using $D^2$ENDIST algorithm is presented as dashed line. The simulated value of throughput by using DENDIST algorithm in conjunction with FM algorithm is presented as solid line. The rerouting time period is set to one second. As observed in FIG. 6, the throughput performance by using DENDIST algorithm in conjunction with FM algorithm approaches the throughput performance by using $D^2$ENDIST algorithm at any time moment. Particularly, when $D^2$ENDIST algorithm is applied to data center network 100 under soft defined network system, since the computational complexity approaches $O(N_S^5)$, the hardware for $D^2$ENDIST algorithm is difficult to realize. In the present invention, DENDIST algorithm in conjunction with FM algorithm is applied to data center network 100 instead of using $D^2$ENDIST algorithm. Since the computational complexity is reduced to between $O(N_S^2)$ and $O(N_S^3)$, the hardware for optimizing the allocation of all link paths in data center 100 is realizable.

In the present invention, a data center network flow migration method and system are disclosed. The idea is to use DENDIST algorithm for rerouting over utilized link path in data center network. After rerouting all link paths with over utilization by using DENDIST algorithm, the controller further rerouting a few of link paths still over utilized by using FM algorithm. Both DENDIST algorithm and FM algorithm have low computational complexity. When DENDIST algorithm in conjunction with FM algorithm is applied to data center network, the throughput performance approaches the throughput performance by using $D^2$ENDIST algorithm according to simulation result. Thus, the data center network flow migration method of the present invention can improve transmission efficiency with low computational complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flow migration method for a data center network, the method comprising
   detecting a utilized loading value in each switch of a plurality of switches in the data center network by a controller according to topology information of the data center network;
   re-establishing a plurality of link paths corresponding to the plurality of switches in the data center network by the controller according to the utilized loading value in each switch and a disjoint edge node divided spanning tree algorithm, wherein a computational complexity of the disjoint edge node divided spanning tree algorithm approaches $O(N_S^3)$, $N_S$ being the number of the switches in the data center network, and O(•) being the function of computational complexity (big O); and when the utilized loading value of at least one link path is greater than a threshold value in the re-established link paths corresponding to the plurality of switches in the data center network, rerouting the at least one link path with the utilized loading value greater than the threshold value by a controller according to a flow migration algorithm.

2. The method of claim 1, wherein the topology of data center network is Fat-Tree topology information, and the switches in the data center network comprise a plurality of core level switches, a plurality of aggregate level switches, and a plurality of edge level switches.

3. The method of claim 1, wherein the disjoint edge node divided spanning tree algorithm is a static link path allocation algorithm.

4. The method of claim 1, wherein a computational complexity of the flow migration algorithm approaches $O(N_S^2)$.

5. The method of claim 1, wherein when the utilized loading value of the at least one link path is greater than the threshold value in the re-established link paths corresponding to the plurality of switches in the data center network, rerouting the at least one link path with the utilized loading value greater than the threshold value by the controller according to a flow migration algorithm comprises:

when the utilized loading value of the at least one link path is greater than the threshold value in the re-established link paths corresponding to the plurality of switches in the data center network, the controller sorting the at least one link path with the utilized loading value greater than the threshold value according to the utilized loading value; and the controller sequentially rerouting the at least one link path with the utilized loading value greater than the threshold value by sorting order from a link path with highest utilized loading value to a link path with lowest utilized loading value.

6. The method of claim 1, wherein when rerouting the at least one link path with the utilized loading value greater than the threshold value, denotes that rerouting the at least one link path with the utilized loading value greater than the threshold value to at least one new link path with utilized loading value smaller than or equal to the threshold value.

7. A flow migration system for a data center network, the system comprising:

a plurality of switches being interconnected according to topology information; and a controller connected to the plurality of switches;

wherein the controller detects a utilized loading value in each switch of the plurality of switches in the data center network according to the topology information of the data center network, the controller is configured to re-establish a plurality of link paths corresponding to the plurality of switches in the data center network according to the utilized loading value in each switch and a disjoint edge node divided spanning tree algorithm, and when the utilized loading value of at least one link path is greater than a threshold value in the re-established link paths corresponding to the plurality of switches in the data center network, the at least one link path with the utilized loading value greater than the threshold value is rerouted by the controller according to a flow migration algorithm, wherein a computational complexity of the disjoint edge node divided spanning tree algorithm approaches $O(N_S^3)$, $N_S$ being the number of the switches in the data center network, and O(•) being the function of computational complexity (big O).

8. The system of claim 7, wherein the plurality of switches comprises:

a plurality of core level switches;

a plurality of aggregate level switches connected to the plurality of core level switches; and a plurality of edge level switches connected to the plurality of aggregate level switches; wherein the plurality of core level switches are topmost switches in the data center network and the plurality of edge level switches are lowermost switches in the data center network.

9. The system of claim 7, wherein a computational complexity of the flow migration algorithm approaches $O(N_S^2)$.

* * * * *